United States Patent [19]
Calhoun et al.

[11] 3,771,095
[45] Nov. 6, 1973

[54] MONOLITHIC INTEGRATED CIRCUIT RESISTOR DESIGN FOR OPTIMUM RESISTOR TRACKING
[75] Inventors: Harry C. Calhoun; Carl L. Kaufman, both of Wappingers Falls, N.Y.
[73] Assignee: International Business Machines Corporation, Armonk, N.Y.
[22] Filed: Dec. 21, 1972
[21] Appl. No.: 317,492

[52] U.S. Cl.................. 338/320, 29/593, 29/620
[51] Int. Cl............................................ H01c 1/16
[58] Field of Search................. 338/320, 308, 195; 29/620, 593

[56] References Cited
UNITED STATES PATENTS
3,390,453  7/1968  Riddle.............................. 29/620
3,458,847  7/1969  Waits................................ 338/320

Primary Examiner—E. A. Goldberg
Attorney—Richard C. Sughrue et al.

[57] ABSTRACT

An integrated circuit including integrated circuit resistors whose geometries are designed in accordance with the method of significant weights in order to optimize resistor tracking relative to process-induced changes in resistor values. The result of this method is an integrated circuit in which different resistors have different, rather than the same, widths.

7 Claims, 1 Drawing Figure

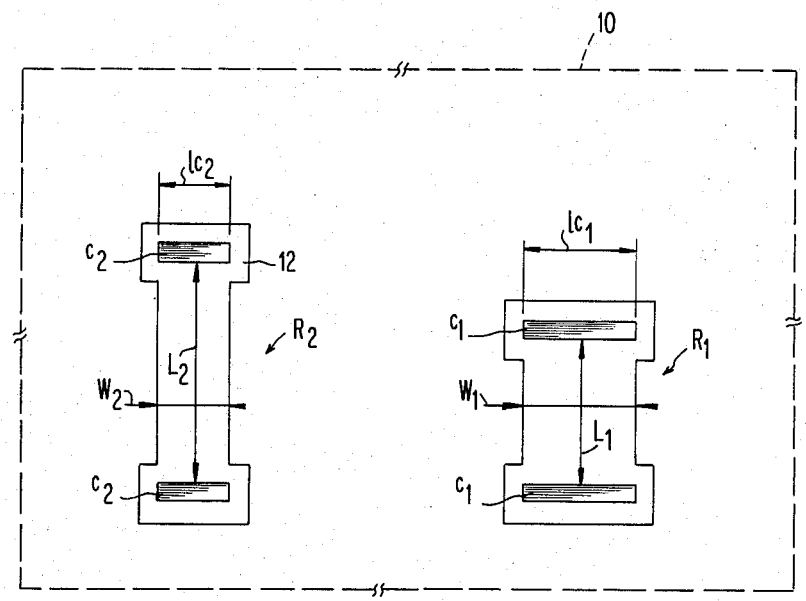

MONOLITHIC INTEGRATED CIRCUIT RESISTOR DESIGN FOR OPTIMUM RESISTOR TRACKING

BACKGROUND OF THE INVENTION

1. Field of the Invention

The invention relates to the field of integrated circuits and the manufacture thereof, and more particularly to an integrated circuit structure and manufacture thereof wherein the geometry of integrated circuit resistors is designed to minimize process-induced changes in the ratios of the values of two or more of the resistors.

2. Description of the Prior Art

The performance and therefore the yield of many integrated circuits depends largely upon the ability to minimize process-induced changes in the ratios of the values of two or more resistors on a semiconductor substrate, such as a silicon chip. The variation in this ratio, that is, the degree to which the value of one resistor varies with respect to that of another resistor during the processing of the integrated circuit structure is called resistor tracking and is expressed by:

$$R_T = [R_{1M}/R_1 - R_{2M}/R_2] \times 100\%$$

where:

$R_1$ and $R_2$ are resistor design values, $R_{1M}$ and $R_{2M}$ are measured resistor values after processing, and $R_T$ is resistor tracking (in percent).

In order to have good circuit performance, $R_T$ should be as close to zero percent as possible. This means that $R_1$ and $R_2$ should be designed such that if $R_1$ varies from its design value due to processing, then $R_2$ also varies from its design value by the same percentage.

Up to this time, it has been thought that maximum opitimization of resistor tracking was obtained by making all the integrated circuit resistors the same width.

SUMMARY OF THE INVENTION

The primary object of this invention is to provide an improved integrated circuit structure and method of manufacture thereof including a novel design of integrated circuit resistors such that optimum resistor tracking is achieved and circuit performance is made more consistent.

Another object of the invention is to provide a method of designing integrated circuit resistors to obtain optimum resistor tracking by applying a method of significant weights to determine resistor geometry.

A more specific object of the invention is to provide a method of optimizing resistor tracking in an integrated circuit structure wherein the integrated circuit resistors are designed to have different widths.

BRIEF DESCRIPTION OF THE DRAWING

The single FIGURE diagrammatically illustrates a circuit structure having two integrated circuit resistors designed in accordance with the invention.

BRIEF DESCRIPTION OF A PREFERRED EMBODIMENT

In integrated circuit technology, it is known that the design value of an integrated circuit resistor changes during the processing of the circuit such that the final measured value of an integrated circuit resistor is different from the original design value. In order to make circuit performance more consistent, it is of interest to know not only how much a given resistor varies from its design value because of the process-induced changes, but also how the value of each integrated circuit resistor varies with respect to another integrated circuit resistor in the same circuit. A measure of this change in the ratios of resistor values due to process-induced changes is called resistor tracking and is expressed as a percent by the following expression:

$$R_T = [R_{1M}/R_1 - R_{2M}/R_2] \times 100\%$$

where:

$R_1$ and $R_2$ are the design values in ohms of two integrated circuit resistors $R_1$ and $R_2$, $R_{1M}$ and $R_{2M}$ are the measured resistor values in ohms after the circuit has been processed, and $R_T$ is resistor tracking in percent.

In order to have good circuit performance, it is desirable to have the resistor tracking $R_T$ as close to zero percent as possible. To accomplish such a result, the geometries of $R_1$ and $R_2$ should be designed such that the variation in the value of each resistor from its original design value due to processing it the same.

The present invention, while not reducing the resistor tracking $R_T$ to zero, optimizes the value of $R_T$.

For purposes of illustrating the invention, FIG. 1 shows an integrated circuit structure 10 including, for examples, two resistors $R_1$ and $R_2$.

It can be shown mathematically that one way to minimize resistor tracking due to process-induced changes in the design values of the resistors is to make the resistors the same width and the same length. However, these conditions can be met only if the design values of the resistors are the same. In describing the preferred embodiment of the invention, it will be assumed that resistor $R_2$ has a larger design value than resistor $R_1$. Consequently, a trade-off must be made in order to optimize resistor tracking when both resistor lengths and widths are changing during processing of the circuit. We have found that this trade-off can be established for optimizing the resistor tracking by employing a method of significant weights. The significant weight factor S can be expressed by the following equation:

$$S = |\Delta R_W / \Delta R_L| = (L/W)(\Delta W/\Delta L)$$

where:

$S$ = the significant weight factor, $\Delta R_W$ = the process-induced change in the resistor design value due to the change in the width of the resistor, $\Delta R_L$ = the process-induced change in the value of the resistor due to the change in the length of the resistor, $L$ = the design length of the resistor, $W$ = the design width of the resistor, $\Delta W$ = the process-induced change in the width of the resistor, and $\Delta L$ = the process-induced change in the length of the resistor.

It is important to note here that the exact values of length $L$ and width $W$ need not be known, since only the ratio of the length $L$ to width $W$, i.e., the number of squares, of the resistor need be known to determine the significant weight factor $S$.

If we assmue that the geometry of resistor $R_2$ has already been determined from the amount of area on the semiconductor chip 10 available for the resistor, then the width $W_1$ of resistor $R_1$ for optimum tracking $R_T$ can be calculated directly from:

$$W_1 = SW_2 + (R_2/R_1) W_2/S + 1$$

It can also be shown that the optimum length $l_{c1}$ of the resistor contact $c_1$ in order to obtain minimum, i.e., optimum, resistor tracking $R_T$ due to process-induced contact length variations is expressed by the following equation:

$$l_{c1} = l_{c2} \sqrt{W_1/L_1 \cdot L_2/W_2}$$

where $l_{c2}$ is the known length of the resistor contact $c_2$ of the resistor $R_2$.

Once the resistor width $W_1$ and the contact length $l_{c1}$ have been established by the above equations, a suitable resistor design equation can be used to establish the design length $L_1$ of resistor $R_1$. There follows a specific example incorporating our novel method for determining the design of an integrated circuit resistor $R_1$ in order to obtain the optimum resistor tracking $R_T$ with respect to another integrated circuit resistor $R_2$.

We will assume that the design value of resistor $R_1$ is 400 ohms and the design value of resistor $R_2$ is 1,000 ohms. We will also assume that the length $L_2$ of resistor $R_2$ is fixed by the constraints of the integrated circuit area or region 12 to no more than 2.0 mils. We will also define $\sigma$ as the sheet resistance of the semiconductor chip 10 in ohms per square ($\Omega/\square$) and the constant K as being equal to the end effects constant in ohm-mils. It should also be stated that variations in sheet resistance of the chip 10 have no effect on the resistor tracking $R_T$.

We now assume an integrated circuit process where:
$\sigma = 160$ ohms/square
$\Delta W = 0.05$ mils
$\Delta L = 0.10$ mils
$K = 14.3$ ohms - mils
where $\Delta W$ and $\Delta L$ are the known process-induced changes in width and length, respectively, of integrated circuit resistors fabricated according to the assumed process.

The original design width of integrated circuit resistor $R_2$ can then be determined from the following equation:

$$R_2 = \sigma L_2/W_2 + K/l_{lc2},$$

where $R_2$ is the design value in ohms of resistor $R_2$.

We will also now assume that the contact length $l_{c2}$ for resistor $R_2$ will be the same as the width $W_2$ of resistor $R_2$, so that
$W_2 = \sigma L_2 + K/R_2$
$W_2 = (160)(2.0) + 14.3/1{,}000$
$W_2 = 0.33$ mils
$\therefore l_{c2} = 0.33$ mils Now that the geometry of the integrated circuit resistor $R_2$ has been designed, the resistor $R_1$ must be designed for optimum tracking:

The initial step is to use the significant weight factor equation:

$$S = (L_1/W_1)(\Delta W/\Delta L).$$

Since $L_1/W_1 = R_1/\sigma = 400$ ohms$/160$ ohms/square $= 2.5$ squares, then $S = (2.5)(0.05/0.10) = 1.25.$ Also, since $W_1 = SW_2 + (R_2/R_1) W_2/S + l$, then $W_1 = 1.25$ $(.33) + 1000/400$ $(.33)/1.25 + 1 = 0.55$ mils.

Also, since $l_{c1} = l_{c2} \sqrt{W_1/L_2 \cdot L_2/W_2}$, then $l_{c1} = 0.33$ $\sqrt{6.06/2.50} = 0.52$ mils.

Further, since $L_1 = W_1/\sigma (R_1 - K/L_{c1})$, then $L_1 = 0.55/160 (400 - 14.3/0.52) = 1.28$ miles.

Consequently, the geometry of the resistor $R_1$ for optimum resistor tracking $R_T$ relative to $R_2$ consists of a resistor which has a width of 0.55 mils and a length of 1.28 mils.

While the invention has been particularly shown and described with reference to the preferred embodiment thereof, it will be understood by those skilled in the art that various changes in form and details may be made therein without departing from the spirit and scope of the invention.

We claim:

1. A method of optimizing the tracking between two integrated circuit resistors comprising the steps of:
   a. forming in an integrated circuit structure a first integrated circuit resistor having a known resistance valve $R_2$, a known length $L_2$ and a known width $W_2$; and
   b. forming in the circuit structure a second integrated circuit resistor having a desired resistance value of $R_1$ and having a horizontal geometry formed in accordance with the following steps:
      1. determining a significant weight factor S from the formula $$S = |\Delta R_W/\Delta R_L| = (L_2l/W_2)(\Delta W/\Delta L),$$

where $\Delta R_W$ is the change in value of the resistance of a resistor due to changes in the width thereof during processing of the integrated circuit structure, $\Delta R_L$ is the change in the resistance of a resistor due to changes in the length thereof during processing, and $\Delta W$ and $\Delta L$ are the known process-induced changes in width and length, respectively, of a resistor in the circuit structure; and
      2. making the width $W_1$ of the second resistor equal to $$SW_2 + (R_2/R_1)W_2/S + l.$$

2. The method as defined in claim 1 further comprising designing the length $l_{c1}$ of the contact for the second resistor in accordance with the following equation in order to further optimize tracking between the resistors:

$$l_{c1} = l_{c2} \sqrt{W_1/L_1 \cdot L_2/W_2},$$

where $W_1/L_1$ is equal to the reciprocal of the ratio of the known desired value $R_2$ of the first resistor and the known sheet resistance of the circuit structure, and $l_{c2}$ is the known length of the first resistor contact.

3. A method as defined in claim 2 further comprising designing the length $L_1$ of the second resistor from the known sheet resistance of the circuit structure, the desired value $R_1$ of the second resistor, previously determined values of $W_1$ and $l_{c1}$, and the known end effects constant.

4. The method as defined in claim 3 further comprising the step of determining the length $L_1$ of the second resistor in accordance with the following equation:

$$L_1 = W_1/\sigma (R_1 - K)l_{c1}$$

where $\sigma$ is the known sheet resistance of the circuit structure in ohm-mils, K is the end effects constant in ohm-mils, $W_1$ is the previously determined width of the second resistor in mils, $R_1$ is the known desired resistance of the second resistor in ohms, and $l_{c1}$ is the length of the second resistor contact in mils.

5. An integrated circuit structure having a first and a second integrated circuit resistor formed therein, wherein the second resistor has a width $W_1$ determined according to the method of claim 1.

6. An integrated circuit structure as defined in claim 5 wherein the length $l_{c_1}$ of the contact for the second resistor is determined in accordance with the method of claim 2.

7. An integrated circuit structure as defined in claim 6 wherein the length $L_1$ of the second resistor is determined in accordance with the method of claim 4.

* * * * *